INVENTOR.
John D. Cochin
BY
Townsend and Townsend
Attorneys

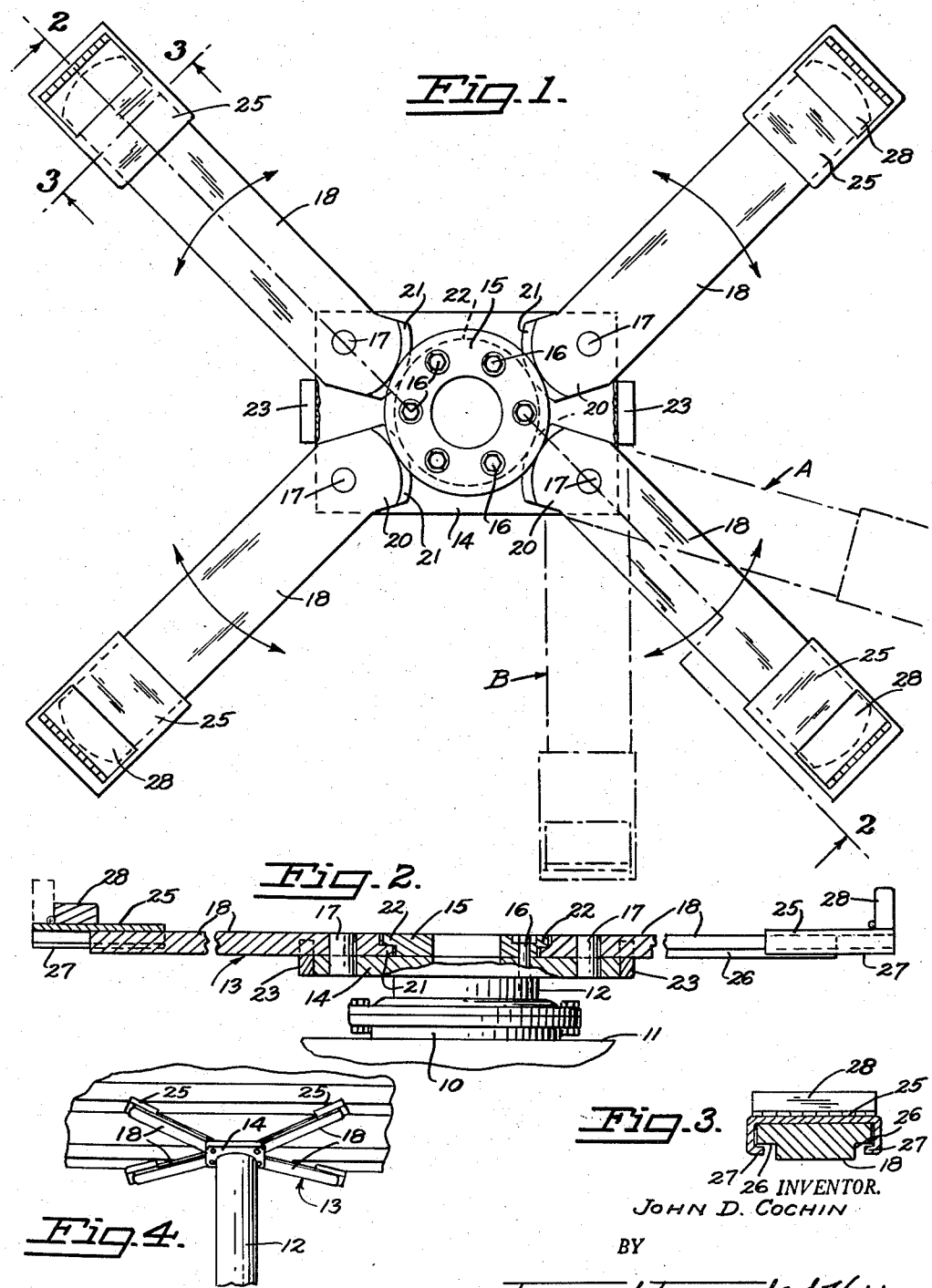

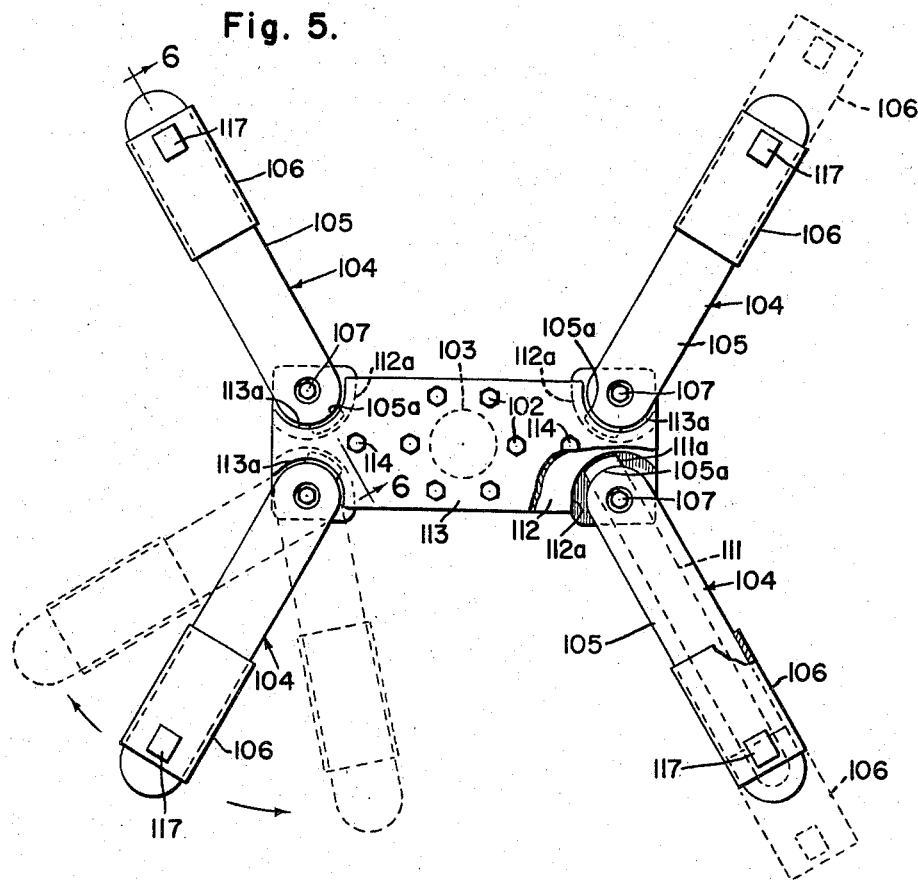
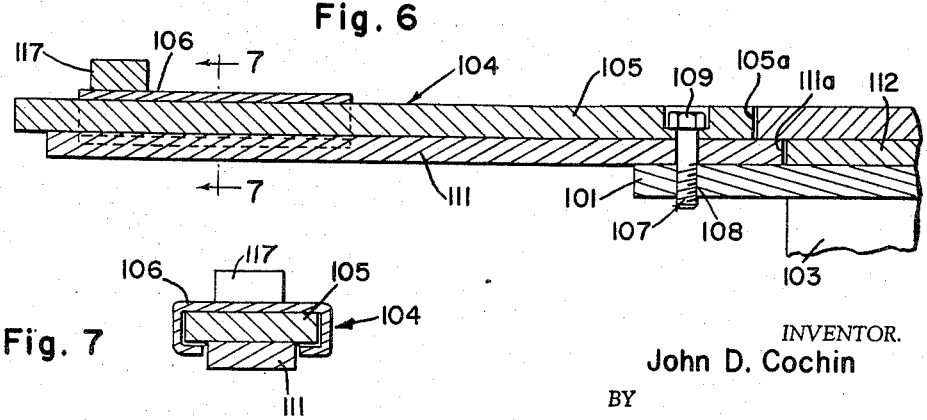
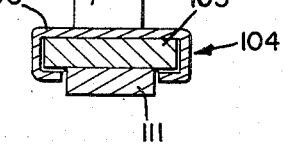
INVENTOR.
John D. Cochin
BY
Townsend and Townsend
Attorneys March 24, 1959    J. D. COCHIN    2,878,897
VEHICLE LIFT STRUCTURE Filed Feb. 21, 1958    3 Sheets-Sheet 3

United States Patent Office 2,878,897
Patented Mar. 24, 1959

2,878,897

VEHICLE LIFT STRUCTURE

John D. Cochin, San Francisco, Calif.

Application February 21, 1958, Serial No. 716,820

8 Claims. (Cl. 187—8.75)

This invention relates to automotive lifts or hoists of the type generally used in garages and service stations, and pertains more particularly to an improved superstructure for mounting atop the head of a ram-type hydraulic lift for supporting a vehicle thereon. This application is a continuation in part of my corresponding application, Serial No. 552,366, filed December 12, 1955, now abandoned.

A principal object of the present invention is to provide a lift superstructure having a plurality of radially or outwardly extending and horizontally swinging support rails which may be individually swung into selected positions beneath the frame or chassis portions of a vehicle to provide support therebeneath for the raising of a vehicle.

Another object of this invention is to provide a lift superstructure of the character briefly mentioned above and having slidable support pads or jacks mounted upon the swingable support rails thereof for longitudinal adjustment along said support rails. The longitudinal sliding adjustment of the support pads in conjunction with the horizontal swinging adjustment of the support rails upon which the pads are mounted provides great flexibility and selectivity in establishing specific points of location and engagement of the support pads with reference to the underside of a vehicle. A particular advantage in this flexibility of adjustment is that the various component parts of the supporting superstructure can be arranged so as not to interfere with the particular vehicle under-parts or areas to which unobstructed access is required for servicing or repair.

A further object is to provide a vehicle lift superstructure, including four swingably mounted horizontally extending arms, and in which each arm is composed of two major slidably extensible or telescopic components. More specifically, in one embodiment indicated, each arm includes a solid metal bar and an elongate shoe slidably mounted on said bar. The length of the shoe may be about one-third the length of the solid bar component and these parts may be slidably adjusted so that the length of the solid metal bar component is perhaps about four-fifths of the total or overall length of the arm when the shoe component has been moved to fully extended position. An advantage of such construction is that the overall length of each arm may be adjustably lengthened or shortened to accommodate different frame widths of supported vehicles. The structure is also such that in vehicles of narrower widths, the total arm length may be withdrawn or retracted to wholly within the width limitations of the vehicle.

Another object is to provide a vehicle superstructure which, in principle, can be applied to both single post and two post hydraulic ram systems. In the single post installation, there is provided a headplate which, in turn, supports four independently swingable vehicle support rails. In the dual or two post installation, each of the two piston rams supports two independently swingable lift rails.

These and other objects and advantages of the invention will become apparent from the following description and the accompanying drawings in which similar reference characters represent corresponding parts in each of the several views, wherein:

In the drawings:

Fig. 1 is a top plan view of a lift superstructure embodying the invention.

Fig. 2 is a sectional view taken substantially on lines 2—2 of Fig. 1.

Fig. 3 is a sectional view taken substantially on lines 3—3 of Fig. 1.

Fig. 4 is a perspective view of a lift ram having a superstructure constructed in accordance with the invention and showing how it may be applied to the underside of a vehicle for supporting same in elevated position.

Fig. 5 is a top plan view of a modified structure embodying the invention.

Fig. 6 is a sectional view taken substantially on line 6—6 of Fig. 5.

Fig. 7 is a sectional view taken on line 7—7 of Fig. 6.

Figure 8:
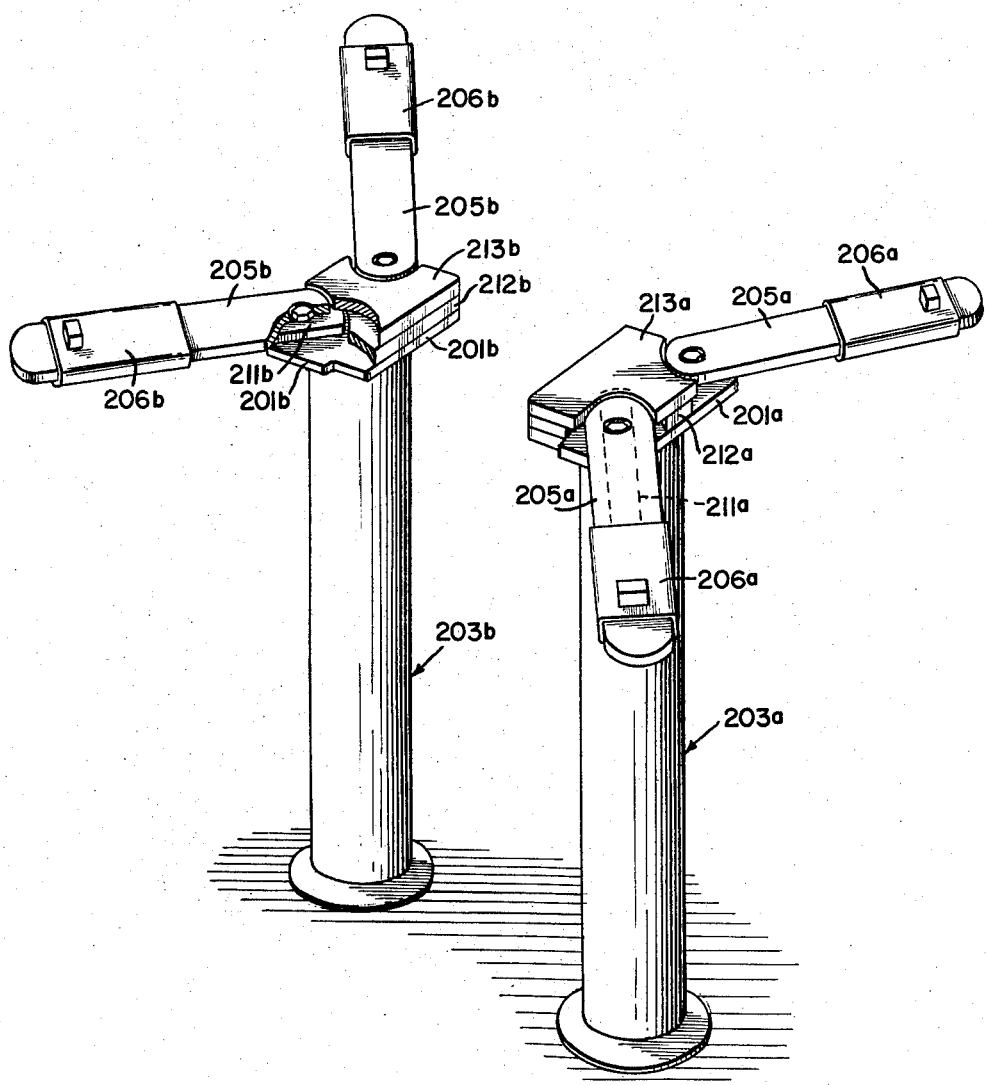
Fig. 8 illustrates how the principles of the invention may be incorporated in a dual lift post system.

Referring in detail to the drawings, there is shown in Fig. 2 a lift having a cylindrical support casing 10 substantially submerged into the ground or floor 11 wherein it is rigidly set. A piston-type ram 12 is mounted within the casing 10 for reciprocating therein as is common construction in lifts of the general type.

The superstructure, designated in its entirety by the numeral 13, is mounted atop the ram 12 and comprises, more specifically, a heavy rectangular bolster or headplate 14 flatly mounted directly atop the ram 12 and secured thereto by bolts 16 which project through a flanged circular retainer 15 and through the said headplate. Anchored adjacent each corner of the head plate 14 is a sturdy and relatively large diameter pivot pin 17. Each pin 17 provides a pivotal mounting for a horizontally swingable cantilever support rail 18 of which there are four.

The inner end portions 20 of the support rails 18 are each angularly bent or offset as is shown in Fig. 1. The inner end 20 of each rail is also provided with an arcuate inwardly projecting flange 21 underlying and slidably engaging an overhanging annular flange 22 on the circular retainer 15 which enables the support rails 18 to resist vertical downward loads as will be obvious. The reason for the rails 18 having offset end portions 20 is to insure that the arcuate flanges 21 will maintain contact and support from the annular flange 22 throughout the desired range of swinging of the support rails 18. As shown by the phantom lines A and B in Fig. 1, any individual support rail 18 may be horizontally swung through a useful arc approaching 90° and still maintain adequate supporting contact between the arcuate flange 21 of the rail and an associated overhanging flange 22 of the retainer 15. The arcuate configuration of the inner end of each rail is defined by a radial arc generated from the point or axis of pivotal connection 17 of the rail to the head plate 14.

The maximum limits of swing of each of the support rails 18 is fixed by upwardly projecting stop members 23 affixed to opposite ends of the head plate 14 and located with respect to the support rails 18 in such manner that a single stop member 23 will act to limit maximum swing in either direction of the two support rails 18 located at the corresponding end of the head plate 14 and adjacent to the stop 23.

The radially projecting rails 18 are each provided with a support pad 25 mounted slidably longitudinally along the length or span of each individual support rail 18.

As shown in detail in Fig. 3, the lower edges of the rails 18 are rabbeted as at 26 to slidably receive depending and underlying flanges 27 of the support pads 25. The support pads 18 are each provided with a hinged chock 28 which can be swung upwardly for engagement with an adjacent frame area of the vehicle.

The overall flexibility of a lift superstructure of the type herein described will be more fully appreciated by realizing that a vehicle may be positioned upon the superstructure 13 in such a manner that the longitudinal centerline of the vehicle need not necessarily be positioned over the center of the head plate 14. For example, by placing any two adjacent support rails 18 in a position corresponding to phantom lines A in Fig. 1 and placing the other two support rails 18 in a position corresponding to phantom lines B, considerable lateral displacement of a vehicle may be achieved with respect to the ram or head plate 14. As above indicated, this feature of flexibility oftentimes may prove advantageous in gaining access to certain under areas or parts of a vehicle which would otherwise be obstructed by the ram or center plate of the supporting superstructure.

Referring now more specifically to Figs. 5, 6 and 7 of the drawings, there is illustrated a relatively rectangular or oblong shaped head plate 101 bolted as at 102 to the upper end of a lift ram 103. Independently pivotally mounted to the head plate 101 are four outwardly extending rails indicated generally at 104, and each including more specifically a solid metal bar 105 and an elongate shoe 106 slidably mounted on the bar 105. The base end of each rail 104 is pivotally secured by a pin 107 having a threaded shank portion 180 engaged with head plate 101 and an enlarged head 109 countersunk within the base of bar 105.

Welded, or otherwise rigidly secured, to the underside of each bar 105 is an elongate cleat 111 having width substantially less than the width of the bar and having its base terminus 111a projecting a substantial distance rearwardly of the base end 105a of said bar. Both the base end 105a of each bar and the base terminus 111a of the cleat associated therewith are arcuately contoured as indicated in Fig. 5 and are defined by radial arcs generated from pivotal axes 108 by which the rails are pivoted to the head plate.

Mounted on top of head plate 101 is a filler plate 112. The four corners of the filler plate 112 are formed with arcuate cutouts 112a substantially complemental in shape to the radius of curvature described by the base terminus 11a of the cleat turning about the axis of its associated pin 107. The thickness of the filler plate 112 is only slightly greater than the thickness of the cleat whereby the terminus 111a of the cleat is free to slidably move between the top surface of the head plate 101 and the undersurface of the retainer plate 113, which said latter plate is bolted by aforementioned bolts 102 and additional bolts 114 to the head plate. The retainer plate is rectangular in plane and is also formed with arcuate cutouts 113a each defining an arc corresponding to the radius curvature described by the arcuate base end 105a of an associated rail 104. Thus, it is seen that the notched-out corners of the retainer plate which define the cutouts 113a overlie and slidably contact the rearwardly extended base termini 111a of the cleats 111. In function, the cooperative relation between portions 111a of the cleats and the overhanging portions 113a of the retainer plate is substantially identical to the coaction previously described with reference to the mutually flanged portions 21 and 22 of the rails 13 and retainer plate 15.

Fig. 5 illustrates in broken lines how each sliding elongate shoe may be slidably moved along its associated rail 104 so as to extend a substantial distance beyond the outer end of said rail. In the embodiment shown in the drawings, the length of each shoe is about one-third the length of its supporting rail whereby each supporting bar 105 accounts for only about four-fifths of the maximum extended length of the rail unit. As shown in solid lines in Fig. 5, each of the shoes 106 may be slidably retracted to various positions wholly within the vertical plane of its associated supporting rail structure. This retractive movement permits the frame engaging block, or accessory 117, to be vertically aligned and engaged with any specific part of a vehicle to be supported, and at the same time, permits shortening of the overall length of the rail 104. In this latter connection, it is highly desirable in working with cars of narrower width, such as modern sports cars and the smaller foreign cars, to insure that the lift superstructure can be retracted or compacted so as to be disposed wholly within the vertical plane of the vehicle itself. In doing this, there is no possibility of a repairman or service person walking into or bumping his head on laterally projecting lift superstructure. Further, by being able to relatively extend and retract the overall length of each rail, it is possible to adjust the rails so as to expose for visual inspection and access a maximum area of the vehicle undercarriage.

Fig. 8 illustrates how the principles of the invention may be applied to a two or dual post lift installation. More specifically, Fig. 8 illustrates front and rear spaced hydraulic rams 203a and 203b. Mounted atop each ram is a headplate 201a and 201b, each of which pivotally supports an associated pair of outwardly extending lift rails 205a and 205b. Each of the twin lift units shown in Fig. 8 incorporates additionally a filler plate, as shown at 212a and 212b, and a retainer plate as shown at 213a and 213b. In the embodiment illustrated, the filler plates and retainer plates may be arcuately cornered in the manner previously described with reference to Figs. 5–7. Each of the rails may further be provided with a cleat, as shown at 211a and 211b, the inner extremities of which underly the overhanging margins of the retainer plates 213a–213b, respectively.

The vehicle rails 205a and 205b are further provided with slidable vehicle frame engaging shoes 206a and 206b which may be considered equivalent in structure and operation to shoes 106 previously described.

As is usual in two post lift installations of more conventional design, the hydraulic rams 203a and 203b may be elevated at selected heights by which either end of a vehicle may be raised to a relatively higher or lower position than the opposite end of the vehicle. It is appreciated that by utilizing radial lift rails with slidable shoes carried thereon, great flexibility of adjustment of the support superstructure relative to vehicles of varying width and wheel base dimensions is obtained.

Although the invention has been described in some detail by way of illustration and example for purposes of clarity or understanding, it is understood that certain changes and modifications may be made without departing from the spirit of the invention as limited only by the scope of the claims appended hereto.

What is claimed is:

1. A vehicle lift superstructure comprising a headplate; a plurality of horizontally disposed and outwardly extending support rails pivotally mounted at their inner end portions on said headplate for independent swingable horizontal movement, the extreme inner ends of said support rails each defining an arcuate portion; and a retainer plate mounted atop the said headplate and secured thereto and having portions overlying and slidably retaining the said arcuate end portions of said swingable rails.

2. The combination of claim 1 and wherein the arcuate configuration of the inner end of each rail is defined by a radial arc generated at the pivotal axis about which each said rail is mounted to said headplate.

3. The combination of claim 1 and wherein there is provided a support shoe slidably mounted upon each said support rail; the length of each shoe being at least about one-third the length of the rail on which it is slidably supported; each shoe slidable to an extended position with a substantial portion of the length of the shoe extending beyond the outer end of the rail; each said shoe slidable to relatively more retracted positions along the rail with the length of the shoe confined wholly within the vertical plane of the rail.

4. The combination of claim 1 and wherein said vehicle lift superstructure comprises spaced forward and rearward independently elevatable vehicle lift rams; and wherein each ram carries a said headplate.

5. The combination of claim 4 and wherein each rail comprises a metal bar component, an elongate cleat secured to the underside of said bar component, and an elongate shoe mounted slidably on said metal bar component; said cleat extending beyond the innermost portions of said bar component defining the said extreme inner end of said rail.

6. A vehicle lift superstructure comprising a headplate; four horizontally disposed and outwardly extending support rails pivotally mounted at their respective end portions adjacent opposite ends of said headplate for independent swingable horizontal movement; the inner ends of said support rails terminating in an arcuate portion, a retainer plate mounted atop the said headplate and secured thereto; said retainer plate having portions overlying and slidably retaining the said arcuate end portions of the said swingable rails; and a pair of stop members attached to opposite ends of the said headplate each operable to contact and limit swing in both directions of an adjacent pair of support rails.

7. The combination of claim 6 and wherein the extreme inner end of each rail defines an arcuate configuration described by a radial arc generated from the pivotal axis about which said rail is pivotally mounted to said head plate; the said portions of said filler plate disposed adjacent the inner ends of said rails defining arcuate cutouts formed complementary to the arcuate inner ends of said rails.

8. A vehicle lift superstructure comprising a head plate; a plurality of horizontally disposed and outwardly extending support rails pivotally mounted at their inner end portions on said head plate for independent swingable horizontal movement, the extreme inner ends of said support rails having a common thickness and lying in a common horizontal plane; a filler plate of only slightly greater thickness than the inner ends of said rails mounted atop said head plate and defining portions disposed adjacent the inner ends of each of the rails, and in substantially the same horizontal plane as said inner ends; and a retainer plate supported atop said filler plate and defining portions overlying and slidably retaining the extreme inner ends of said rails.

References Cited in the file of this patent

UNITED STATES PATENTS

| | | |
|---|---|---|
| 1,938,550 | Todd | Dec. 5, 1933 |
| 2,777,538 | Cochin | Jan. 15, 1957 |

FOREIGN PATENTS

| | | |
|---|---|---|
| 497,847 | Belgium | Sept. 15, 1950 |
| 771,271 | Great Britain | Mar. 27, 1957 |
| 315,693 | Switzerland | Aug. 31, 1956 |